US 6,748,366 B1

(12) United States Patent
Hurwitz et al.

(10) Patent No.: US 6,748,366 B1
(45) Date of Patent: Jun. 8, 2004

(54) SYSTEM FOR PROTECTING ANONYMITY OF PARTIES INVOLVED IN A PERSON-TO-PERSON ELECTRONIC COMMERCE TRANSACTION

(75) Inventors: Roger A. Hurwitz, Portland, OR (US); Tim M. Carver, Hillsboro, OR (US); Carl M. Ellison, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/481,747

(22) Filed: Jan. 11, 2000

(51) Int. Cl.[7] .............................................. G06F 17/30
(52) U.S. Cl. .......................... 705/53; 705/54; 705/55; 705/56; 705/65; 235/380
(58) Field of Search ................ 705/53, 39, 50–80, 705/24; 235/380

(56) References Cited

U.S. PATENT DOCUMENTS

| 6,049,785 A | * | 4/2000 | Gifford | ......................... 705/39 |
| 6,126,069 A | * | 10/2000 | Stiefel et al. | ............... 235/380 |
| 6,205,436 B1 | * | 3/2001 | Rosen | ......................... 705/65 |

FOREIGN PATENT DOCUMENTS

WO        WO 01/35276 A1  *  5/2001   ........... G06F/17/30

OTHER PUBLICATIONS

Glass, Brett; Keeping your private information private; Jun. 6, 2000, PC Magazine, p. 118.*
Mingail, Sandra; Better to server or to protect, banks: Online privacy; Dec. 20, 1999; Financial Post, p. 12.*

* cited by examiner

Primary Examiner—James P. Trammell
Assistant Examiner—C Owen Sherr
(74) Attorney, Agent, or Firm—Blakely, Sokoloff, Taylor & Zafman LLP

(57) ABSTRACT

A person-to-person electronic commerce system that protects the anonymity of buyers and sellers. Embodiments of the present invention interpose a trusted intermediary between the buyer and seller during the transaction fulfillment process. Buyer and seller may disclose their personal information to the trusted intermediary. The trusted intermediary then arranges payment and shipping on behalf of the parties. In this way, neither buyer nor seller need know anything about the other in order to fulfill the transaction. The system may include an auction web site for holding an electronic auction of goods resulting in a transaction between a buyer and a seller, and a trusted intermediary, coupled to the auction web site, to obtain transaction, buyer, and seller information from the auction web site, to arrange for shipment of the goods with a selected shipper, to generate an encrypted mailing label, at least part of the transaction, buyer, and seller information being included as part of the encrypted mailing label, to send the encrypted mailing label to the seller, to receive notification of acceptance by the buyer once buyer receives the goods from the seller via the shipper, and to send payment for the goods to the seller.

20 Claims, 3 Drawing Sheets

SYSTEM FOR PROTECTING ANONYMITY OF PARTIES INVOLVED IN A PERSON-TO-PERSON ELECTRONIC COMMERCE TRANSACTION

BACKGROUND

1. Field

The present invention relates generally to electronic commerce systems and methods and, more specifically, to person-to-person electronic commerce transactions.

2. Description

The Internet and the World Wide Web (WWW) now enable private parties who do not know each other to do business in a way that was not possible before. Exemplified by web sites providing auctions, person-to-person electronic commerce is projected to grow dramatically in the next few years. This growth in person-to-person electronic commerce is remarkable considering the typical constraints placed on the parties to the electronic auction, such as the absence of effective transaction fulfillment services. For example, there is currently no widely used person-to-person credit card model. Another barrier to growth stems from the very nature of person-to-person electronic commerce itself.

By definition, person-to-person electronic commerce involves private party sellers, not established businesses (such as well-known retailers, wholesalers, mail order companies, etc.). This lack of "establishment" reduces the degree of trust the parties to a transaction can place in each other, especially the trust of the buyer in the seller. Buyers and sellers on-line typically know very little about each other, a problem made worse by the lack of face-to-face presence between the parties. Because of these inherent factors, individuals are put into the position of doing business with complete strangers. While people are usually willing to exchange money with strangers for goods that they desire, they are understandably concerned about exchanging personal information, such as name, address, telephone number, email address, and credit card number. Unfortunately, that is precisely the kind of information that buyers and sellers are forced to exchange today to do business in an on-line person-to-person electronic commerce system.

Therefore, there is a need for a method and system for protecting the anonymity of parties to a person-to-person electronic commerce transaction.

SUMMARY

An embodiment of the present invention is a method of protecting the anonymity of a buyer and a seller during fulfillment of a person-to-person electronic commerce transaction. The method includes obtaining transaction, buyer, and seller information, arranging for shipment of goods that are subject of the transaction with a selected shipper, and generating an encrypted mailing label, at least part of the transaction, buyer, and seller information being included as part of the encrypted mailing label. The method further includes sending the encrypted mailing label to the seller, receiving notification of acceptance by the buyer once buyer receives the goods from the seller via the shipper, and sending payment for the goods to the seller.

Another embodiment of the present invention is a person-to-person electronic commerce system that protects the anonymity of buyers and sellers. The system includes an auction web site for holding an electronic auction of goods resulting in a transaction between a buyer and a seller, and a trusted intermediary, coupled to the auction web site, to obtain transaction, buyer, and seller information from the auction web site, to arrange for shipment of the goods with a selected shipper, to generate an encrypted mailing label, at least part of the transaction, buyer, and seller information being included as part of the encrypted mailing label, to send the encrypted mailing label to the seller, to receive notification of acceptance by the buyer once buyer receives the goods from the seller via the shipper, and to send payment for the goods to the seller.

Other embodiments are described and claimed.

BRIEF DESCRIPTION OF THE DRAWINGS

The features and advantages of the present invention will become apparent from the following detailed description of the present invention in which.

DETAILED DESCRIPTION

An embodiment of the present invention is a system whereby individual buyers and sellers can exchange money and goods and/or services on-line while at the same time protecting their personal information from each other. Protecting the anonymity of individuals on-line in this way reduces a significant barrier to doing business with each other.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Embodiments of the present invention interpose a trusted intermediary between the buyer and seller during the transaction fulfillment process. Buyer and seller may disclose their personal information to the trusted intermediary. The trusted intermediary then arranges payment and shipping on behalf of the parties. In this way, neither buyer nor seller need know anything about the other in order to fulfill the transaction. When the buyer and seller meet and conduct the transaction in an on-line context, the parties may utilize on-line login "names" or pseudonyms that may not correspond with the real names of the parties. To support this anonymity, the parties may have to register with the auction site prior to the transaction. During registration, a party may provide name and address information and receive an auction pseudonym.

Figure 1:
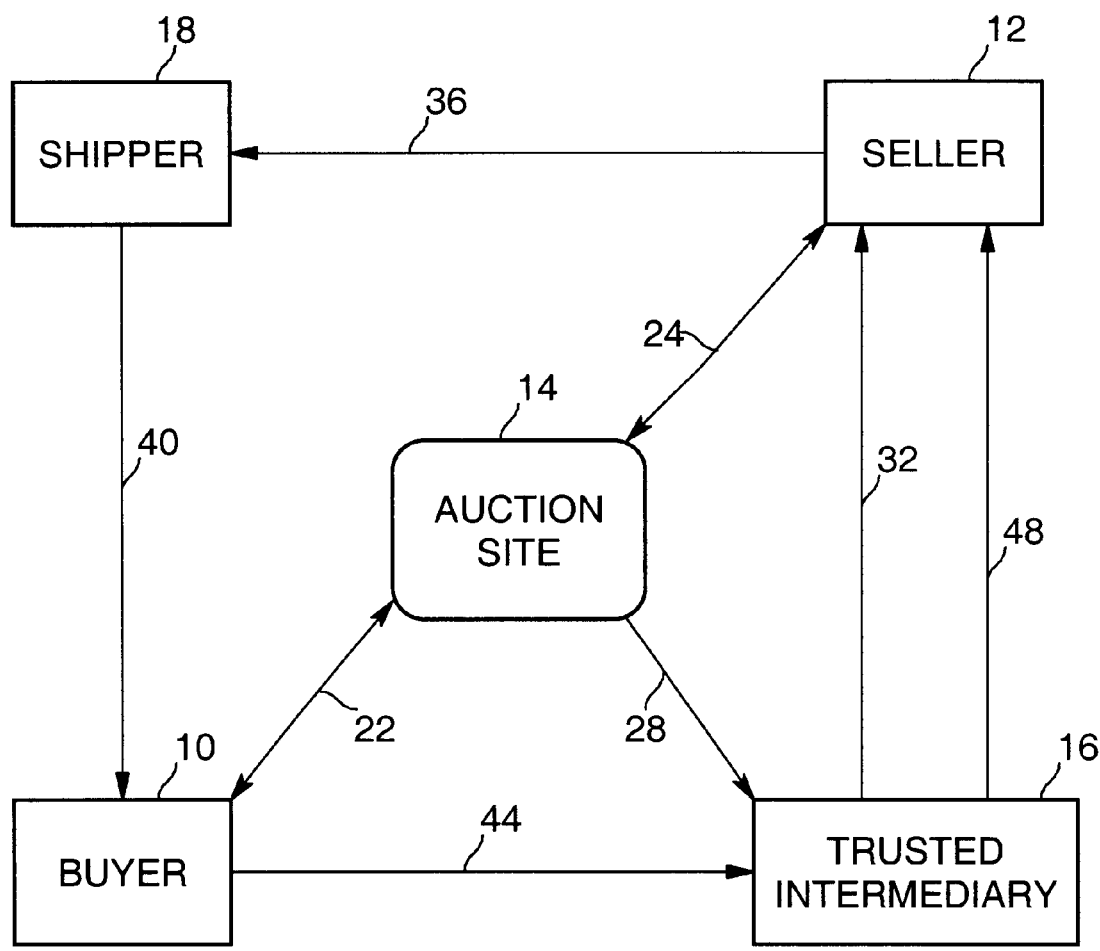
FIG. 1 is a diagram of a person-to-person electronic commerce system for protecting the anonymity of buyers and sellers according to an embodiment of the present invention.

Embodiments of the present invention work by interacting with automated transaction fulfillment systems to obtain, store, and report transaction participant performance information. Transaction fulfillment systems for person-toperson electronic commerce web sites automate payment and shipping functions between transaction participants by acting as a trusted intermediary. FIG. 1 is a diagram of a person-to-person electronic commerce system for protecting the anonymity of buyers and sellers according to an embodiment of the present invention. A buyer 10 and a seller 12 may "meet" in cyberspace at a web site run by an on-line auction house, classified advertising manager, or trading portal 14 (generally referred to herein as "auction site"). As is well-known in the art, buyers and sellers may visit the auction site by using browser and network connectivity software running on a machine such as a personal computer (PC) system, handheld communications device, cellular telephone, personal digital assistant (PDA), or other device. The buyer 10, seller 12, and auction site 14 may be connected via a communications network (not shown), such as the Internet. The buyer and seller interact with each other on-line in any one of numerous transaction types. One such transaction type is an auction. When a transaction is entered into by the buyer and seller, transaction fulfillment functions such as payment and shipping may be provided by trusted intermediary 16.

Trusted intermediary 16 may be a system affiliated with the on-line auction site 14 to enable buyers and sellers to complete transactions begun at the auction site. In some embodiments, trusted intermediary 16 may be integral with the on-line auction processing provided by the auction site, or it may be provided by a separate commercial entity as a service to the auction site and the transaction participants. The trusted intermediary may communicate with auction site 14 via a public communications network such as the Internet, or via a private or direct connection. Trusted intermediary 16 receives information about the transaction from the auction site 14, the buyer 10, and the seller 12 and coordinates fulfillment of these functions by interacting with other entities such as shipping and delivery companies, credit card companies, banks, credit unions, credit reporting companies, etc., in such a way as to protect the anonymity of the parties to the transaction. For example, the buyer may provide information such as his or her name, billing address, shipping address, credit card information, bank account information, and delivery parameters to the trusted intermediary. The seller may provide information such as his or her name, address, description of the goods sold, desired shipping parameters, and so on. The auction site may provide information such as a transaction identifier, transaction time and date, etc. The trusted intermediary then arranges for shipping of the goods by the seller, and payment, either directly or indirectly, by the buyer to the seller. Shipper 18 handles the physical delivery of the goods. Shipping may be handled by any of the well-known shipping and freight companies (e.g., U.S. Postal Service, United Parcel Service, Federal Express, etc.).

Figure 2:
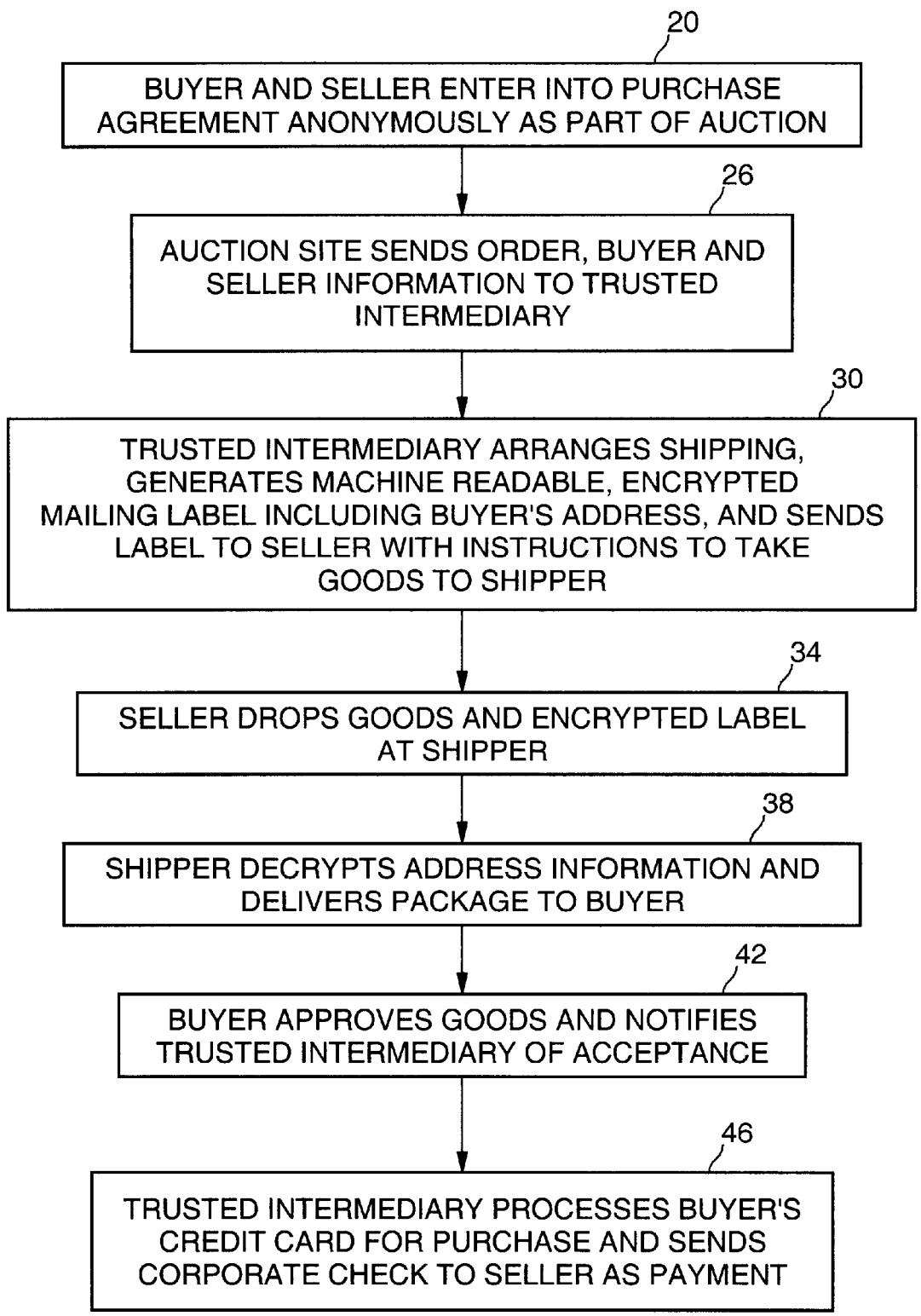
FIG. 2 is a flow diagram illustrating protection of anonymity of buyers and sellers in a person-to-person electronic commerce transaction according to an embodiment of the present invention.

Anonymity may be protected according to the following system and method. FIG. 2 is a flow diagram illustrating protection of anonymity of buyers and sellers in a person-to-person electronic commerce transaction according to an embodiment of the present invention. At block 20, the buyer and the seller enter into a purchase agreement anonymously (that is, their true names or identities are not disclosed during the transaction). In one embodiment, this takes place during an electronic auction controlled by an auction site. In other embodiments, other transaction models may be used. The communication between the parties is represented as lines 22 and 24 on FIG. 1. At block 26 of FIG. 2, the auction site sends the transaction, buyer, and seller information to the trusted intermediary. This is represented by line 28 on FIG. 1. The communicated information may include email and physical addresses for the parties, payment details, and shipping details. At block 30 of FIG. 2, the trusted intermediary arranges for shipping of the goods with shipper 18, generates an electronic machine readable mailing label for the seller to attach to the goods, and electronically sends the label to the seller 12 with instructions to take the package containing the goods to the shipper's drop-off site. In one embodiment, the label may be sent via electronic mail to the seller in any one of several well-known digital graphical image formats (e.g., graphical image format (.gif), Joint Photographic Experts Group (JPEG) format (.jpg), Windows bit map (.bmp), etc.). Preferably, the machine-readable label is encrypted with the public key of the shipper so that only the shipper (not the seller) may decrypt the label to determine the buyer's name and address and other information. The encryption of the label may be performed with any one of several well-known cryptographic schemes such as public key cryptography (e.g., Data Encryption Standard (DES)). Communication of the shipping label to the sender is represented as line 32 on FIG. 1.

At this point, the seller may print out the encrypted shipping label, but the seller cannot decipher the label to determine information about the buyer. At block 34, the seller packs the goods into a package, attaches the encrypted label to the package, and drops the package off at the shipper. This is represented as line 36 on FIG. 1. Next, at block 38 of FIG. 2, the shipper decrypts the shipping name and address information on the package by using the shipper's private key, and delivers the package to the buyer. The delivery is represented on FIG. 1 as line 40. At block 42 of FIG. 2, the buyer approves of the goods and notifies the trusted intermediary of acceptance. This communication is represented as line 44 on FIG. 1. The acceptance may include payment information such as a credit card number and expiration date. If the buyer does not accept the goods and wishes to return them, the buyer may contact the trusted intermediary for an encrypted machine readable shipping label for sending the goods back to the seller in a manner similar to the original shipping described above.

Finally, at block 46 the trusted intermediary processes the buyer's payment information for the purchase and sends a corporate check of the trusted intermediary to the seller as payment for the goods. This communication is represented as line 48 on FIG. 1. Alternatively, other methods of payment my be used, such as credit to a credit card account, wire transfer to a bank account, and so on. In another embodiment, the trusted intermediary may obtain the payment information and buyer's authorization for the payment at the start of the transaction, possibly before the trusted intermediary sends the shipping label to the seller. In this way, the seller can trust that the seller will receive payment once he or she ships the goods.

Another benefit of the present invention, other than protecting privacy of the parties, is that it prevents the parties from canceling the current transaction on the auction site and conducting the transaction privately between the parties, thereby depriving the auction site of its commission on the sale. This deterrence is accomplished because the parties are anonymous in the present system. That is, in an auction transaction, the seller does not know the real identity of the winning bidder, so he or she doesn't know whom Embodiments of the present invention interpose a trusted intermediary between the buyer and seller during the transaction fulfillment process. Buyer and seller may disclose their personal information to the trusted intermediary. The trusted intermediary then arranges payment and shipping on behalf of the parties. In this way, neither buyer nor seller need know anything about the other in order to fulfill the transaction to contact directly to complete the transaction outside of the auction. In fact, instead of using pseudonyms or on-line names known to the parties during the auction, pseudo-random numbers may be generated for the bidders and the winning bidder's pseudo-random number may be mapped to the buyer's information and sent to the trusted intermediary.

In another embodiment, the trusted intermediary and the shipper may be the same entity. That is, the shipper may perform the functions of the trusted intermediary in this system, as well as the shipper functions described above. The shipper may receive the buyer, seller, and transaction information from the auction site and generate the encrypted mailing label. The shipper may also store this information in a computer system managed by the shipper. Once the shipper receives the goods from the seller along with the encrypted mailing label, the shipper may scan the label and decrypt the information contained thereon in order to obtain the buyer's address used for delivery, or the shipper may obtain the buyer's address from its own computer system according to information contained in the encrypted label. When the shipper is the trusted intermediary, cryptographic means other than public key cryptography may be employed to encrypt the mailing label.

When the auction site performs the functions of the trusted intermediary, the auction site manages an auction of goods to be sold by a seller, identifies a winning bidder as a buyer of the goods in a transaction, and obtains information identifying the buyer, and the seller, and the transaction. The auction site then performs transaction fulfillment functions as described in blocks 30, 42 and 46 of FIG. 2.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system embodying the playback device components includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a removable storage media or device (e.g., floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 3:
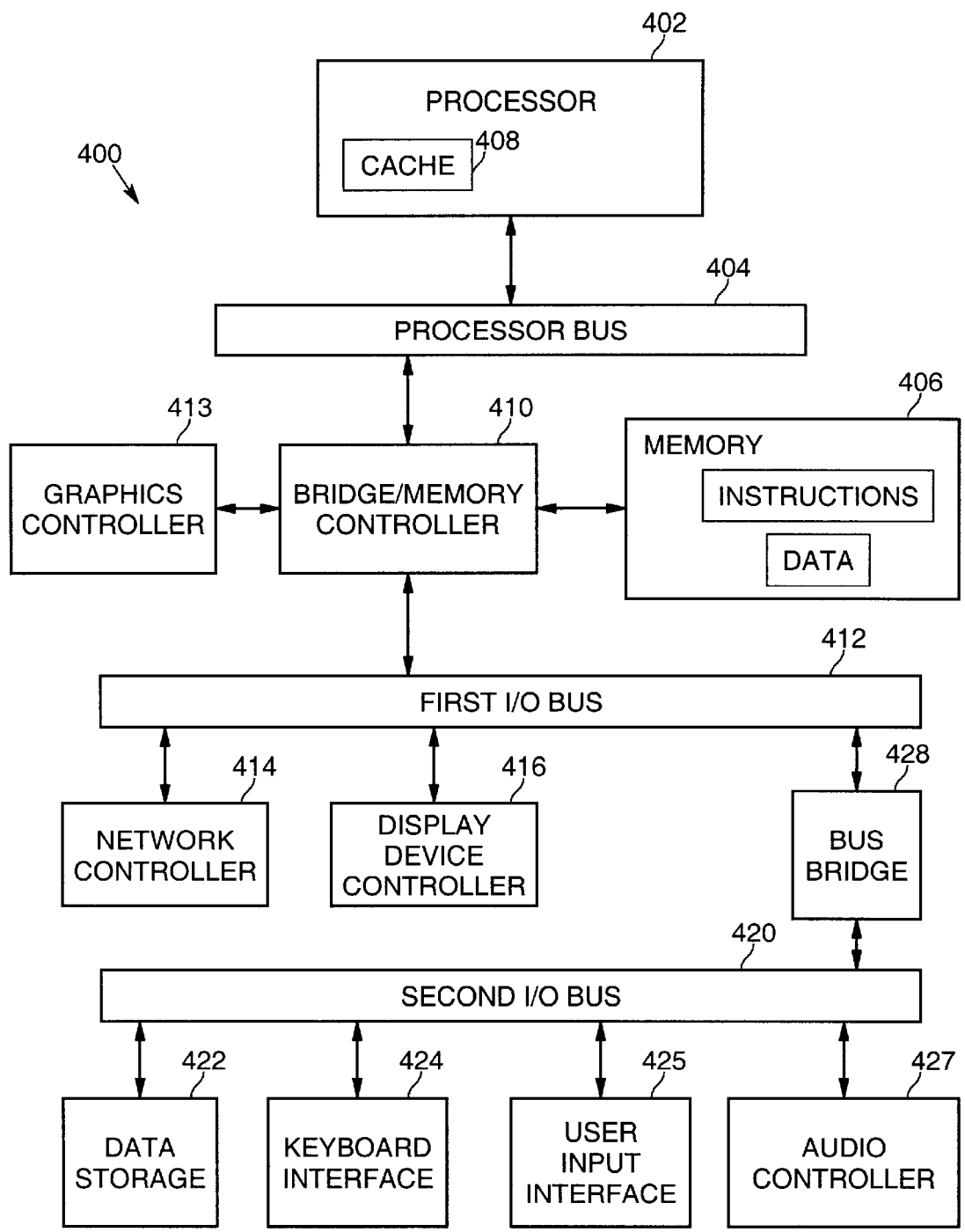
FIG. 3 is a diagram illustrating a sample computer system for implementing protection of anonymity of buyers and sellers in a person-to-person electronic commerce transaction according to an embodiment of the present invention.

An example of one such type of processing system is shown in FIG. 3, however, other systems may also be used and not all components of the system shown are required for the present invention. Sample system 400 may be used, for example, to execute the processing for embodiments of the secure automatic playback system, in accordance with the present invention, such as the embodiment described herein. Sample system 400 is representative of processing systems based on the PENTIUM® II, PENTIUM® III, and CELERON™ microprocessors available from Intel Corporation, although other systems (including personal computers (PCs) having other microprocessors, engineering workstations, other set-top boxes, and the like) and architectures may also be used.

FIG. 3 is a block diagram of a system 400 of one embodiment of the present invention. The system 400 includes a processor 402 that processes data signals. Processor 402 may be coupled to a processor bus 404 that transmits data signals between processor 402 and other components in the system 400.

System 400 includes a memory 406. Memory 406 may store instructions and/or data represented by data signals that may be executed by processor 402. The instructions and/or data may comprise code for performing any and/or all of the techniques of the present invention. Memory 406 may also contain additional software and/or data (not shown). A cache memory 408 may reside inside processor 402 that stores data signals stored in memory 406.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In this embodiment, graphics controller 413 interfaces to a display device (not shown) for displaying images rendered or otherwise processed by the graphics controller 413 to a user.

First I/O bus 412 may comprise a single bus or a combination of multiple buses. First I/O bus 412 provides communication links between components in system 400. A network controller 414 may be coupled to the first I/O bus 412. In some embodiments, a display device controller 416 may be coupled to the first I/O bus 412. The display device controller 416 allows coupling of a display device to system 400 and acts as an interface between a display device (not shown) and the system. The display device receives data signals from processor 402 through display device controller 416 and displays information contained in the data signals to a user of system 400.

A second I/O bus 420 may comprise a single bus or a combination of multiple buses. The second I/O bus 420 provides communication links between components in system 400. A data storage device 422 may be coupled to the second I/O bus 420. A keyboard interface 424 may be coupled to the second I/O bus 420. A user input interface 425 may be coupled to the second I/O bus 420. The user input interface may be coupled to a user input device, such as a remote control, mouse, joystick, or trackball, for example, to provide input data to the computer system. An audio controller 427 may be coupled to the second I/O bus for handling processing of audio signals through one or more loudspeakers (not shown). A bus bridge 428 couples first I/O bridge 412 to second I/O bridge 420.

Embodiments of the present invention are related to the use of the system 400 as an electronic commerce platform. According to one embodiment, such processing may be performed by the system 400 in response to processor 402 executing sequences of instructions in memory 404. Such instructions may be read into memory 404 from another computer-readable medium, such as data storage device 422, or from another source via the network controller 414, for example. Execution of the sequences of instructions causes processor 402 to execute electronic commerce processing according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 400 perform their conventional functions in a manner well-known in the art. In particular, data storage device 422 may be used to provide long-term storage for the executable instructions and data structures for embodiments of the anonymity protection system in accordance with the present invention, whereas memory 406 is used to store on a shorter term basis the executable instructions of embodiments of the anonymity protection system in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of protecting anonymity of buyer and seller during fulfillment of a person-to-person electronic commerce transaction by a trusted intermediary comprising:
   obtaining transaction, buyer, and seller information;
   arranging for shipment of goods that are subject of the transaction with a selected shipper;
   electronically generating an encrypted mailing label, at least part of the transaction, buyer, and seller information being included as part of the encrypted mailing label;
   sending the encrypted mailing label to the seller;
   receiving notification of acceptance by the buyer once buyer receives the goods from the seller via the shipper; and
   sending payment for the goods to the seller.

2. The method of claim 1, further comprising receiving payment for the goods from the buyer.

3. The method of claim 1, further comprising receiving credit authorization for payment of the goods from the buyer.

4. The method of claim 1, wherein sending the encrypted mailing label to the seller comprises sending the encrypted mailing label electronically to the seller, the encrypted mailing label being represented as a digital graphical image.

5. The method of claim 1, wherein the transaction is associated with an electronic auction managed by an auction web site.

6. The method of claim 1, wherein generating the encrypted mailing label comprises generating the encrypted mailing label using the selected shipper's public key.

7. The method of claim 1, wherein the encrypted mailing label comprises the buyer's name and address information.

8. An article comprising: a storage medium having a plurality of machine readable instructions, wherein when the instructions are executed by a processor, the instructions provide for the protection of anonymity of buyer and seller during fulfillment of a person-to-person electronic commerce transaction, the instructions including obtaining transaction, buyer, and seller information, arranging for shipment of goods that are subject of the transaction with a selected shipper, generating an encrypted mailing label, at least part of the transaction, buyer, and seller information being included as part of the encrypted mailing label, sending the encrypted mailing label to the seller, receiving notification of acceptance by the buyer once buyer receives the goods from the seller via the shipper, and sending payment for the goods to the seller.

9. The article of claim 8, further comprising instructions for receiving payment for the goods from the buyer.

10. The article of claim 8, further comprising instructions for receiving credit authorization for payment of the goods from the buyer.

11. The article of claim 8, wherein instructions for sending the encrypted mailing label to the seller comprise instructions for sending the encrypted mailing label electronically to the seller, the encrypted mailing label being represented as a digital graphical image.

12. The article of claim 8, wherein instructions for generating the encrypted mailing label comprise instructions for generating the encrypted mailing label using the selected shipper's public key.

13. The article of claim 8, wherein the encrypted mailing label comprises the buyer's name and address information.

14. A person-to-person electronic commerce system protecting anonymity of buyers and sellers comprising:
   an auction web site for holding an electronic auction of goods resulting in a transaction between a buyer and a seller;
   a trusted intermediary, coupled to the auction web site, to obtain transaction, buyer, and seller information from the auction web site, to arrange for shipment of the goods with a selected shipper, to generate an encrypted mailing label, at least part of the transaction, buyer, and seller information being included as part of the encrypted mailing label, to send the encrypted mailing label to the seller, to receive notification of acceptance by the buyer once buyer receives the goods from the seller via the shipper, and to send payment for the goods to the seller.

15. The system of claim 14, wherein the buyer and seller are known to each other only by pseudonyms.

16. The system of claim 14, wherein a public key cryptographic process is used to encrypt the mailing label.

17. The system of claim 14, wherein the encrypted mailing label sent to the seller is sent electronically to the seller and the encrypted mailing label comprises a digital graphical image.

18. The system of claim 14, wherein the trusted intermediary receives at least one of payment and credit authorization for the goods from the buyer.

19. A method of operating an auction web site to protect anonymity of parties to a person-to-person electronic commerce transaction comprising:

managing an auction of goods to be sold by a seller;

identifying a winning bidder as a buyer of the goods in a transaction and obtaining information identifying the buyer, and the seller, and the transaction;

arranging for shipment of the goods with a selected shipper;

generating an encrypted mailing label, at least part of the transaction, buyer, and seller information being included as part of the encrypted mailing label;

sending the encrypted mailing label to the seller;

receiving notification of acceptance by the buyer once buyer receives the goods from the seller via the shipper; and sending payment for the goods to the seller.

20. The method of claim 19, further comprising receiving at least one of payment or credit authorization for the goods from the buyer.

* * * * *